(12) United States Patent
Pruthi et al.

(10) Patent No.: US 8,862,838 B1
(45) Date of Patent: Oct. 14, 2014

(54) LOW OVERHEAD MEMORY SPACE MANAGEMENT

(71) Applicant: Toshiba Corporation, Tokyo (JP)

(72) Inventors: Arvind Pruthi, Los Gatos, CA (US); Sandeep Karmarkar, Pune, IN (US)

(73) Assignee: Toshiba Corporation, Tokyo (JP)

( * ) Notice: Subject to any disclaimer, the term of this patent is extended or adjusted under 35 U.S.C. 154(b) by 0 days.

(21) Appl. No.: 14/057,749

(22) Filed: Oct. 18, 2013

Related U.S. Application Data

(63) Continuation of application No. 13/078,359, filed on Apr. 1, 2011, now Pat. No. 8,566,534.

(60) Provisional application No. 61/320,222, filed on Apr. 1, 2010.

(51) Int. Cl.
  *G06F 12/00* (2006.01)
  *G06F 12/02* (2006.01)
(52) U.S. Cl.
  CPC .................................. *G06F 12/023* (2013.01)
  USPC ....................................................... 711/154
(58) Field of Classification Search
  None
  See application file for complete search history.

(56) References Cited

U.S. PATENT DOCUMENTS

| 6,049,850 | A | 4/2000 | Vishlitzky et al. |
| 6,996,680 | B2 | 2/2006 | Mogi et al. |
| 7,155,573 | B1 | 12/2006 | Levin-Michael et al. |
| 7,500,063 | B2 | 3/2009 | Zohar et al. |
| 2006/0112232 | A1 | 5/2006 | Zohar et al. |
| 2010/0180081 | A1 | 7/2010 | Bose et al. |

*Primary Examiner* — Brian Peugh
(74) *Attorney, Agent, or Firm* — White & Case LLP

(57) ABSTRACT

Methods, apparatus, and systems, including computer programs encoded on a computer storage medium, manage an address space. In some implementations, a method includes managing an allocation data structure for a memory, wherein the allocation data structure indicates groupings of memory space, each of the groupings having a different associated integer, and each of the groupings serving memory space in portions equal to a unit of memory space allocation times the associated integer for that grouping; receiving a request for allocation within the memory, wherein the request has an associated number of the unit of memory space allocation; and selecting one of the groupings from which to serve the request for allocation within the memory based on the associated number in comparison with values obtained using the different associated integers as an exponent.

25 Claims, 7 Drawing Sheets

LOW OVERHEAD MEMORY SPACE MANAGEMENT

CROSS REFERENCE TO RELATED APPLICATIONS

This application is a continuation application (and claims the benefit of priority under 35 USC 120) of U.S. application Ser. No. 13/078,359, filed Apr. 1, 2011, which claims the benefit of the priority of U.S. Provisional Application Ser. No. 61/320,222, filed Apr. 1, 2010 and entitled "Low Overhead space management for Large Caches." The content of this application is incorporated by reference in its entirety.

BACKGROUND

The present disclosure describes systems and techniques relating to management of an address space for large caches.

A storage server system, such as a SAN (Storage Area Network) or NAS (Network-Attached Storage), has the primary purpose of providing shared storage that can be accessed by computers attached to the server through a network. A typical storage server is designed to serve as storage to many (10s or 100s or even 1000s) computers. What a computer attached to the storage server sees as a physically contiguous space is really composed of many physically disparate chunks of storage. The multiple physically disparate chunks of storage may be disks or disk partitions aggregated together as redundant array of inexpensive disks (RAID) devices.

A solid state disk (SSD) can be used as a large cache in front of a disk array. Most disk arrays or RAID controllers have some cache on them already to help with performance, but in comparison to an SSD these are relatively small. With SSD the memory available to cache can expand to 64-256 GB or more. This makes the likelihood of a cache miss significantly lower. In addition, using SSD as a large cache can help to fix a performance problem more cost effectively than adding more mechanical drives or replacing those drives with faster drives.

SUMMARY

The present disclosure includes systems and techniques for managing a cache address space associated with cache devices. According to an aspect of the described systems and techniques, a method includes receiving data to be cached in a cache address space associated with a cache memory. The cache address space includes two or more designated portions of the cache address space, such that each of the two or more designated portions has an associated minimum amount of data allowed to be cached therein. Additionally, the respective minimum amounts of the two or more designated portions are different from each other. The method also includes selecting a cache address for caching the received data from one of the two or more designated portions of the cache address space that has an associated minimum amount of data allowed to be cached therein being less than the received data. Further, the method includes caching the received data at the selected cache address, and accessing at least a subset of the data cached at the selected cache address.

These and other implementations can include one or more of the following features. The method can included determining the one of the two or more designated portions as a designated portion that has a largest associated minimum amount of data allowed to be cached therein from among ones of the two or more designated portions having respective minimum amounts of data allowed to be cached therein that are less than the received data.

In some implementations, the respective minimum amounts of data allowed to be cached in the two or more designated portions of the cache address space represent contiguous addresses within the two or more designated portions.

In some implementations, the respective minimum amounts of the two or more designated portions are larger than or equal to a predetermined amount of data, Furthermore, the method can include removing a part of the data cached at the selected cache address, such that the removed part is at least equal to the predetermined amount of data, whether or not the removed part of the data cached at the selected cache address is at least equal to the associated minimum amount of data allowed to be cached in the one of the two or more designated portions.

The minimum amounts of data allowed to be cached in the two or more designated portions of the cache address space can be respective integer multiples of the predetermined amount.

The one of the two or more designated portions of the cache address space can include one or more groups of contiguous addresses therein, and each group of the one or more groups includes two or more subgroups of chunks. A chunk is equal to the predetermined amount of data. Further, each of the two or more subgroups can be equal to the minimum amount of data allowed to be cached in the one of the two or more designated portions and can include an associated quantity of chunks. Selecting the cache address for caching the received data from the one of the two or more designated portions of the cache address space can be performed at least in part by using a data structure associated with a group included in the one of the two or more designated portions. The data structure is configured to indicate whether the two or more subgroups included in the group are occupied or partially occupied. Removing the part of the data cached at the selected cache address is performed at least in part by using the data structure associated with the group and another data structure associated with the group. The other data structure is configured to indicate whether the associated quantity of chunks included in each of the two or more subgroups of the group are free or occupied.

In some implementations, selecting the cache address for caching the received data from the one of the two or more designated portions of the cache address space further can include determining, within the one of the two or more designated portions, the group as having unoccupied subgroups among the two or more subgroups; identifying, based on the determined group's data structure, a quantity of subgroups within the determined group that are unoccupied and cumulatively equal to or larger than the received data, and based on the determined group's other data structure, another quantity of chunks corresponding to the identified quantity of subgroups. The other quantity of chunks cumulatively equal to the received data, and a combination of the identified quantities of subgroups and chunks represents the selected cache address. Selecting the cache address can further include updating the determined group's data structure to indicate that the identified quantity of subgroups are currently occupied; and updating the determined group's other data structure to indicate that the other identified quantity of chunks are currently occupied.

In some implementations, removing the part of the data cached at the selected cache address can further include determining, within the one of the two or more designated portions, the group corresponding to the part of the data cached at the selected address; updating the determined group's other data structure to indicate that a quantity of chunks corresponding to the removed part of the data cached at the selected cache address are currently unoccupied; and updating the determined group's data structure to indicate that another quantity of subgroups corresponding to the removed part of the data cached at the selected cache address are currently unoccupied. A subgroup is indicated to be unoccupied when all chunks included in the subgroup are unoccupied.

In some implementations, the method can also include determining that all subgroups of the determined group are unoccupied in response to said removing the part of the data cached at the selected cache address, and indicating that the group is unoccupied. In some implementations, the one of the two or more designated portions of the cache address space can include a collection of two or more occupied groups and another collection of two or more partially-occupied groups.

According to another aspect, the described subject matter can also be implemented in a system including a cache device communicatively coupled with a storage system. The system also includes one or more devices containing a management structure of a cache address space associated with the cache device. Further, the system includes a controller configured to maintain the management structure to include two or more designated portions of the cache address space, such that each of the two or more designated portions has an associated minimum amount of data allowed to be cached therein, and the respective minimum amounts of the two or more designated portions are different from each other. The controller is further configured (i) to receive data from the storage system to be cached in the cache address space associated with the cache device, (ii) to select a cache address from one of the two or more designated portions of the cache address space that has an associated minimum amount of data allowed to be cached therein being less than the received data, and (iii) to cache the received data at the selected cache address.

These and other implementations can include one or more of the following features. The controller can be configured to determine the one of the two or more designated portions as a designated portion that has a largest associated minimum amount of data allowed to be cached therein from among ones of the two or more designated portions having respective minimum amounts of data allowed to be cached therein that are less than the received data. In some implementations, the respective minimum amounts of data allowed to be cached in the two or more designated portions of the cache address space represent contiguous addresses within the two or more designated portions. In some implementations, the respective minimum amounts of the two or more designated portions are larger than or equal to a predetermined amount of data. Further, the controller can be configured to remove a part of the data cached at the selected cache address, such that the removed part is at least equal to the predetermined amount of data. The minimum amounts of data allowed to be cached in the two or more designated portions of the cache address space are respective integer multiples of the predetermined amount.

According to another aspect, the described subject matter can also be implemented in a system including a cache device communicatively coupled with a storage system. The system also includes a management structure of a cache address space associated with the cache device, such that the management data structure is loaded in a memory. Further, the system includes a controller configured to maintain the management structure loaded in the memory to include two or more designated portions of the cache address space. Each of the two or more designated portions has an associated minimum amount of data allowed to be cached therein, such that the respective minimum amounts of the two or more designated portions are different from each other and larger than or equal to a predetermined amount of data. Also, each of the two or more designated portions includes one or more groups of contiguous addresses therein. In addition, each group of the one or more groups includes two or more subgroups of chunks, where a chunk is equal to the predetermined amount of data. Each of the two or more subgroups is equal to a respective minimum amount allowed to be cached in each of the two or more designated portions and includes an associated quantity of chunks. Each group further has a data structure configured to indicate whether the two or more subgroups included in the associated group are occupied or partially occupied, and another data structure configured to indicate whether the associated quantity of chunks included in each of the two or more subgroups of the associated group are free or occupied. The controller is further configured to receive data from the storage system to be cached in the cache address space associated with the cache device. Furthermore, the controller is configured to select a cache address from a group of one of the two or more designated portions of the cache address space that has an associated minimum amount of data allowed to be cached therein that is less than the received data. Moreover, the selection of the cache address is based on an indication from a data structure associated with the group. Additionally, the controller is configured to remove a part of the data cached at the selected cache address, such that the removed part is at least equal to the predetermined amount of data. The part removal is based at least in part on respective indications from the data structure associated with the group, and from the other data structure associated with the group.

These and other implementations can include one or more of the following features. In some implementations, the one of the two or more designated portions of the cache address space can include a collection of two or more occupied groups and another collection of two or more partially-occupied groups.

In some implementations, selection of the cache address from the group of the one of the two or more designated portions of the cache address space includes a determination that the group has unoccupied subgroups; an identification, based on (i) the determined group's data structure, of a quantity of subgroups within the determined group that are unoccupied and cumulatively equal to or larger than the received data, and based on (ii) the determined group's other data structure, another identification of another quantity of chunks corresponding to the identified quantity of subgroups. The other quantity of chunks is cumulatively equal to the received data, and a combination of the identified quantities of subgroups and chunks represents the selected cache address. The selection of the cache address from the group further includes an update of the group's data structure to indicate that the identified quantity of subgroups are currently occupied, and another update of the group's other data structure to indicate that the other identified quantity of chunks are currently occupied.

In some implementations, removal of the part of the data cached at the selected cache address includes a determination, within the one of the two or more designated portions, of the group corresponding to the part of the data cached at the selected address; an update of the group's other data structure to indicate that a quantity of chunks corresponding to the removed part of the data cached at the selected cache address are currently unoccupied; and another update of the group's data structure to indicate that another quantity of subgroups corresponding to the removed part of the data cached at the selected cache address are currently unoccupied. A subgroup is indicated to be unoccupied when all chunks included in the subgroup are unoccupied. Additionally, the controller can be configured to determine that all subgroups of the group are unoccupied after the removal of the part of the data cached at the selected cache address, and to indicate that the group is unoccupied.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus to perform operations described. Thus, program implementations can be realized from a disclosed method, system, or apparatus and apparatus implementations can be realized from a disclosed system, computer-readable medium, or method. Similarly, method implementations can be realized from a disclosed system, computer-readable medium, or apparatus and system implementations can be realized from a disclosed method, computer-readable medium, or apparatus.

The described systems and techniques can allow a large cache address space associated with a cache device to be managed with a very small memory overhead. For example, a 256 GB of cache address space can be managed in approximately 6.5 MB of memory by using the disclosed systems and methods. Additionally, unallocated regions of a given order in the cache address space can be found very quickly. For example, an allocation group for allocation can be found in a single lookup, while a first-set bit inside a current order bitmap can be obtained within 4 to 5 comparisons. In addition, even if some range from the cache address space has been allocated based on the disclosed management rules and structures, the allocated space can be freed in many different ways. This can allow a controller to allocate cache address space depending on user request but free/evict the same based on internal algorithms.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

The systems and methods disclosed in this specification can be used for managing a cache address space associated with cache devices. More specifically, the methods are configured to minimize a total amount of data used for managing cache allocations. For example, most common cache allocations can be optimized in accordance with the disclosed methods by allocating maximum contiguous portions that are available in the cache address space. In this manner, the systems and techniques described herein can be implemented to manage allocation requests which tend to have few request sizes and target a cache memory space that has a large size. For example, the disclosed technology can be applied for managing block based SSD caches of direct attached storage, network attached storage (NAS) and storage area networks (SAN).

Figure 1:
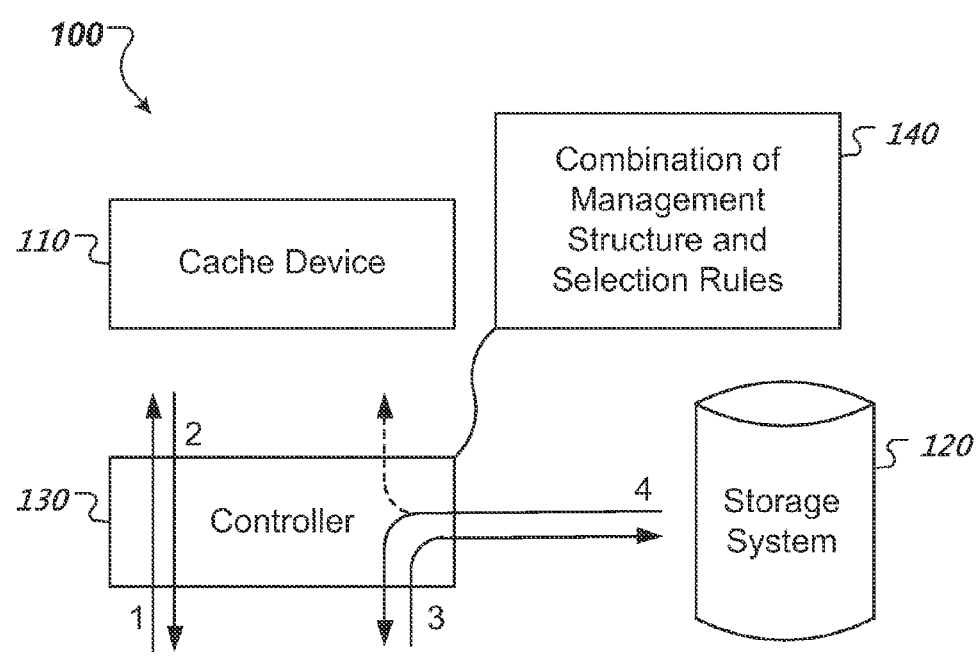
FIG. 1 shows an example of a system for management of a cache address space associated with cache devices.

FIG. 1 shows an example of a system 100 for managing a cache address space associated with a cache device 110. The system 100 includes a controller 130 communicatively coupled with the cache device 110 and with a storage system 120. The controller 130 is configured to manage a cache address space associated with the cache device 110. In some implementations, the cache device 110 can be an SSD. In some implementations, the cache device can be flash memory. The storage system 120 can be direct attached storage (e.g., a hard drive), a NAS or a SAN.

The system 100 can be implemented in multiple ways. In some implementations, the controller 130 can be part of the storage system 120 and can be configured to manage the cache memory space associated with a cache device 110 (e.g., an SSD) attached to the storage system 120. In some implementations, the controller 130 and the cache device 110 can be part of a caching appliance configured to be attached to the storage system 120. In some implementations, the cache device 110 and the controller 130 can be integrated within the storage system 120. For example, an SSD can be integrated either as a drive or a Peripheral Component Interconnect Express (PCIe) card inside of a server of the storage system 120, and a controller of the storage system 120 can be configured to operate the internal SSD. In some implementations, the cache device 110, the storage system 120 and the controller 130 can be operated separately from each other. For example, the functions of the controller 130 can be carried out by data processing apparatus, e.g., a central processing unit (CPU) associated with a computer system in communication with one or more SSD drives (representing the cache device 110) and with storage arrays of a storage system 120.

The controller 130 can be configured to handle requests for retrieving data from the cache device 110. The requests can be received from a data processing apparatus (not shown in FIG. 1) in communication with the controller 130. The requesting operations (1), (3) are represented by solid arrows. The request (1) can result in a cache-hit and, consequently, the controller 130 can retrieve (2) the requested data from the cache device 110. The retrieving operation (2) is represented by a solid-arrow and can include providing the retrieved data to the data processing apparatus, for instance. Additionally, the request (3) can result in a cache-miss and, consequently, the controller 130 can request the data from the storage system 120 instead of from the cache device 110. In this manner, the retrieving operation (4) can include providing the requested data to the data processing apparatus (represented by a solid-arrow) and caching the retrieved data to the cache device 110 (represented by a dashed-arrow).

Moreover, the controller 130 can be configured to select an address of the cache address space associated with the cache device 110 for caching the retrieved data. The selection can be performed by the controller 130 using a management structure for the cache address space and rules for selecting an address from the cache address space in accordance with the management structure. The combination 140 of the management structure and the rules can be maintained by the controller 130. For example, the combination 140 of the management structure and the rules can represent data structure(s), program code, or a combination thereof, each of which encoded in computer readable medium. In some implementations, the combination 140 can be maintained in memory (e.g., random access memory, RAM) associated with the controller 130. In some implementations, the combination 140 can be maintained in cache memory associated with the cache device 110. The technologies described in this specification can minimize a total amount of data used for maintaining the combination 140 of the management structure and the rules, and thus, reducing a memory overhead for managing the cache address space associated with the cache device 110.

Figure 2:
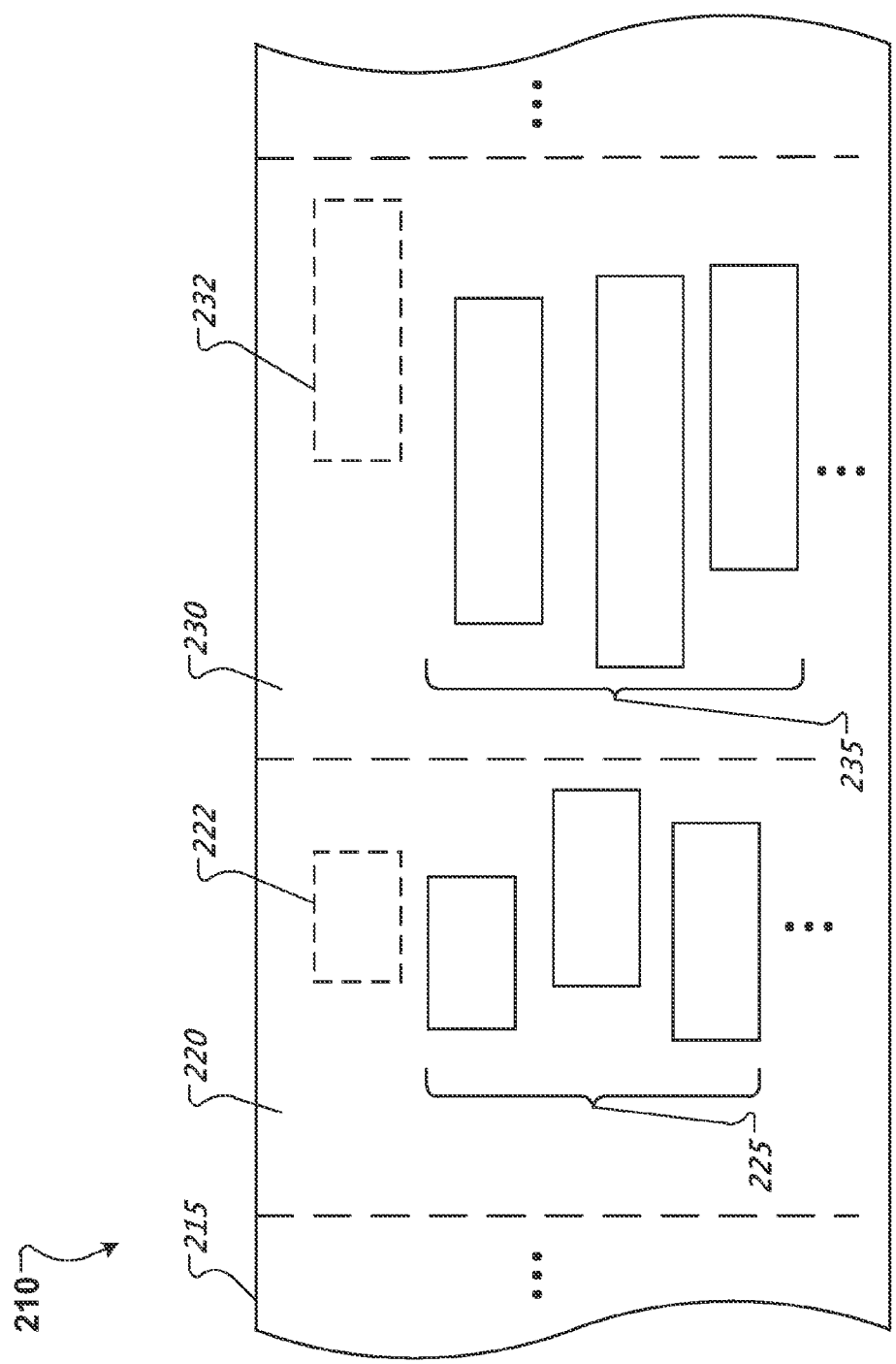
FIG. 2 shows of an example of a management structure for the cache address space associated with the cache devices.

FIG. 2 shows an example of a management structure 210 for a cache address space 215 associated with cache devices. Such a cache device 110 is described above in connection with FIG. 1. Additionally, the management structure 210 can be part of the combination 140 of the management structure and rules for selecting an address from the cache address space maintained by controller 130. The management structure 210 can represent one or more of data, data objects, data structures, programming code or combinations thereof. Further, the management structure can be encoded on computer readable media, e.g., associated with either of the controller 130, the cache device 110 or the storage system 120 as described above in connection with FIG. 1.

The management structure 210 includes multiple portions 220, 230, . . . of the cache address space 215. A portion from among the multiple portions 220, 230, . . . of the cache address space 215 can be referred to, interchangeably, as an allocation slab. The dashed-lines used in FIG. 2 to separate the portions 220, 230, . . . of the cache address space 215 represent boundaries to separate different management rules corresponding to the portions 220, 230, . . . , respectively, of the cache address space 215. For example, each of the multiple portions 220, 230, . . . has an associated minimum amount of data allowed to be cached therein, where the respective minimum amounts 222, 232, . . . of the multiple portions 220, 230, . . . are different from each other and correspond to contiguous ranges of the cache address space 215, respectively. The minimum amounts 222, 232, . . . are depicted as dotted-line rectangles. If the minimum amount 222 associated with the portion 220 is smaller than the minimum amount 232 associated with the portion 230, then a request for an allocation of cache memory larger or equal in size than the minimum amount 222 but smaller in size than the minimum amount 232 can be served from the portion 220 or from other portions having respective minimum amounts smaller than the requested allocation size, but cannot be served from the portion 230 nor from other portions having respective minimum amounts larger than the requested allocation size. In this specification, serving an allocation means selecting an address location and range within the cache address space associated with the cache device for caching, at the selected address, an amount of data having a size equal to a size of the selected range. For example, allocations 225 served from portion 220 correspond to respective contiguous address ranges within the portion 220 that have respective sizes satisfying the foregoing restrictions. As another example, allocations 235 served from portion 230 correspond to respective contiguous address ranges within the portion 230 that have respective sizes satisfying the foregoing restrictions. The above division of the cache address space 215 in the multiple portions 220, 230, . . . having specific properties is a logical division and not a physical one.

A minimum amount of data associated with a portion and allowed to be cached therein corresponds to $2^m$ contiguous chunks of the cache address space 215, where a chunk is the minimum unit of allocation and the exponent m=1, 2, . . . ; a chunk can have a predetermined size. For example, the chunk can be a multiple of a logical block. In some implementations, a size of the block is 4 K. In other implementations, the size of the block is 8 K. In addition, the exponent "m" corresponding to the quantity of chunks $2^m$ that forms the minimum amount of data associated with a portion and allowed to be cached therein represents the order of the portion, or the order of the allocation slab. For example, the minimum amount of data 222 allowed to be cached in the portion 220 of the cache address space 215 can be two chunks. Because 2 chunks=$2^1$, the order of the portion 220 in this case is m=1. As another example, the minimum amount of data 232 allowed to be cached in the portion 230 of the cache address space 215 can be four chunks. Because 4 chunks=$2^2$, the order of the portion 230 in this case is m=2. And so on and so forth.

Moreover, data that was cached at an address of the cache address space 215 associated with the cache device, based on the management structure 210 and the allocation rules described above, can be freed in increment amounts equal to a chunk, regardless of the minimum amount associated with the portion of the cache address space 215 corresponding to the address of the data to be freed. For example, each of the allocations 235 served from the portion 232 (of order 2) is greater than or equal to the minimum amount 232 equal to four chunks. However, amounts of data equal to one, two or three chunks (i.e., smaller than the minimum amount 232 of data allowed to be cached in the portion 230) can be released from any of the allocations 235 cached in the portion 230 of the cache address space 215 associated with the cache device. Freeing parts of cached data having sizes smaller than the corresponding allocation sizes, facilitates monitoring access patterns to the cached data and releasing the parts of the cached data that are accessed less frequently than neighboring cached data.

The respective sizes of the portions 220, 230, . . . can vary during operation of the cache device based on the data allocations to and data releases from each of the portions 220, 230, . . . of the cache address space 215. However, other characteristics of the portions 220, 230, . . . of the cache address space 215 associated with the cache device can be designated upon start-up of the cache device. The designation can include specifying the order of the portions corresponding to the management structure 210, i.e., specifying the maximum size (in terms of multiples of chunks) of the minimum amounts 222, 232, . . . of data allowed to be cached in the portions 220, 230, . . . , respectively. The management structure 210 can further include a management hierarchy described in detail below in connection with FIGS. 4 and 5. Such management hierarchy also can be designated along with the foregoing designation of the portions 220, 230, . . . of the cache address space 215 associated with the cache device upon start-up of the cache device.

Figure 3:
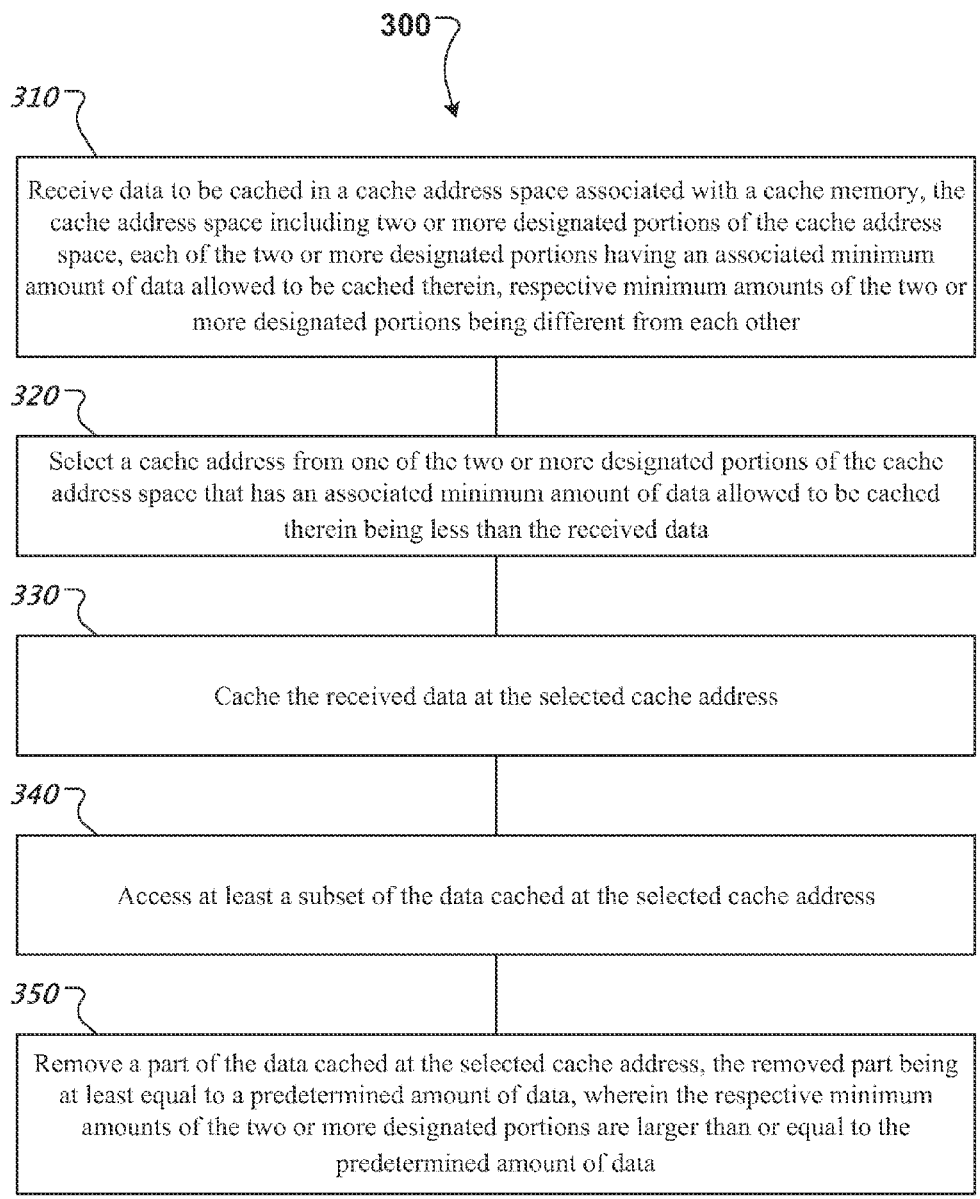
FIG. 3 shows an example of a method for selecting an address in the cache address space associated with the cache devices based on the disclosed management structure.

FIG. 3 shows an example of a method 300 for selecting an address in the cache address space associated with the cache devices based on the management structure disclosed in this specification. In the example illustrated in FIG. 1, the method 300 can be performed by the controller 130 in accordance with the management structure 210 described above in connection with FIG. 2. At 310, data from a storage system (e.g., 120) is received for caching in the cache address space associated with the cache device (e.g., 110). For example, allocations can be called having respective page sizes that are multiples of a chunk size. As described above, the chunk size can be equal to the size of a block in the logical address space associated with the cache device.

At 320, a cache address is selected, in response to receiving the data for caching. The selection is performed, at 320, from one of the two or more designated portions of the cache address space that has an associated minimum amount of data allowed to be cached therein being less than or equal to the received data. In this context, the selected cache address represents an address offset (start) and a contiguous address range (length) within the one of the two or more designated portions of the cache address space. In the example illustrated in FIG. 2, the portions 220, 230, . . . of the cache memory space can be designated to form, at least in part, the management structure 210. In this example, if the size of the received data to be cached has a cumulative size of at least four chunks, then the controller 130 can select the cache address from the portion 230, which has an associated minimum amount 232 equal to four chunks, or from the portion 220, which has an associated minimum amount 222 equal to two chunks.

In some implementations, the method 300 can include determining a designated portion that has a largest associated minimum amount of data allowed to be cached therein from among ones of the two or more designated portions having respective minimum amounts of data allowed to be cached therein that are less than the received data. In the example illustrated in FIG. 2, if the size of the received data to be cached has at least a cumulative size of four chunks, then the controller 130 selects the cache address for caching the received data from the portion 230 and not from the portion 220, because the minimum amount 232 (four chunks) associated with the portion 230 is larger than the minimum amount 222 (two chunks) associated with the portion 220.

At 330, the received data is cached at the selected cache address. In the example illustrated in FIG. 2, the selected address is within the portion 230, and thus, the received data can be cached in this portion along with the previous allocations 235 served from the portion 230 of the cache memory space.

At 340, at least a subset of the data cached at the selected cache address is accessed. In the example illustrated in FIG. 1, the data cached at the selected address is accessed (1) and then retrieved (2) at the request of a data processing apparatus. In addition, a temporal pattern of accesses to and a spatial pattern of accesses around the selected address can be monitored. Based on the monitored temporal and spatial patterns related to the selected address, removal of at least a part of the data cached at the selected address can be triggered.

At 350, a part of the data cached at the selected cache address can be removed. The removal can be responsive to the monitored temporal and spatial patterns described above. The removed part is at least equal to a predetermined amount of data whether or not the removed part of the data cached at the selected cache address is at least equal to the associated minimum amount of data allowed to be cached in the one of the two or more designated portions. The predetermined amount of data, representing the increment amount of data that can be freed from the cache address space, can be designated upon start-up of the cache device, for instance, along with the designation of the minimum amounts of data allowed to be cached in respective portions of the cache address space. Further, the predetermined amount of data can be specified to be a chunk that includes one or more logical blocks of the cache device.

In the example illustrated in FIG. 2, a size of a given data cached at the selected address within portion 230 can be equal to sixteen chunks. For instance, it may be determined that a part (e.g., having a size of three chunks) of the given data cached at the selected address is accessed more sparsely (either temporally or spatially) than other parts of the data cached at the selected address. In response to this determination, the controller 130 can free the sparsely accessed part of the cached given data.

Figure 4:
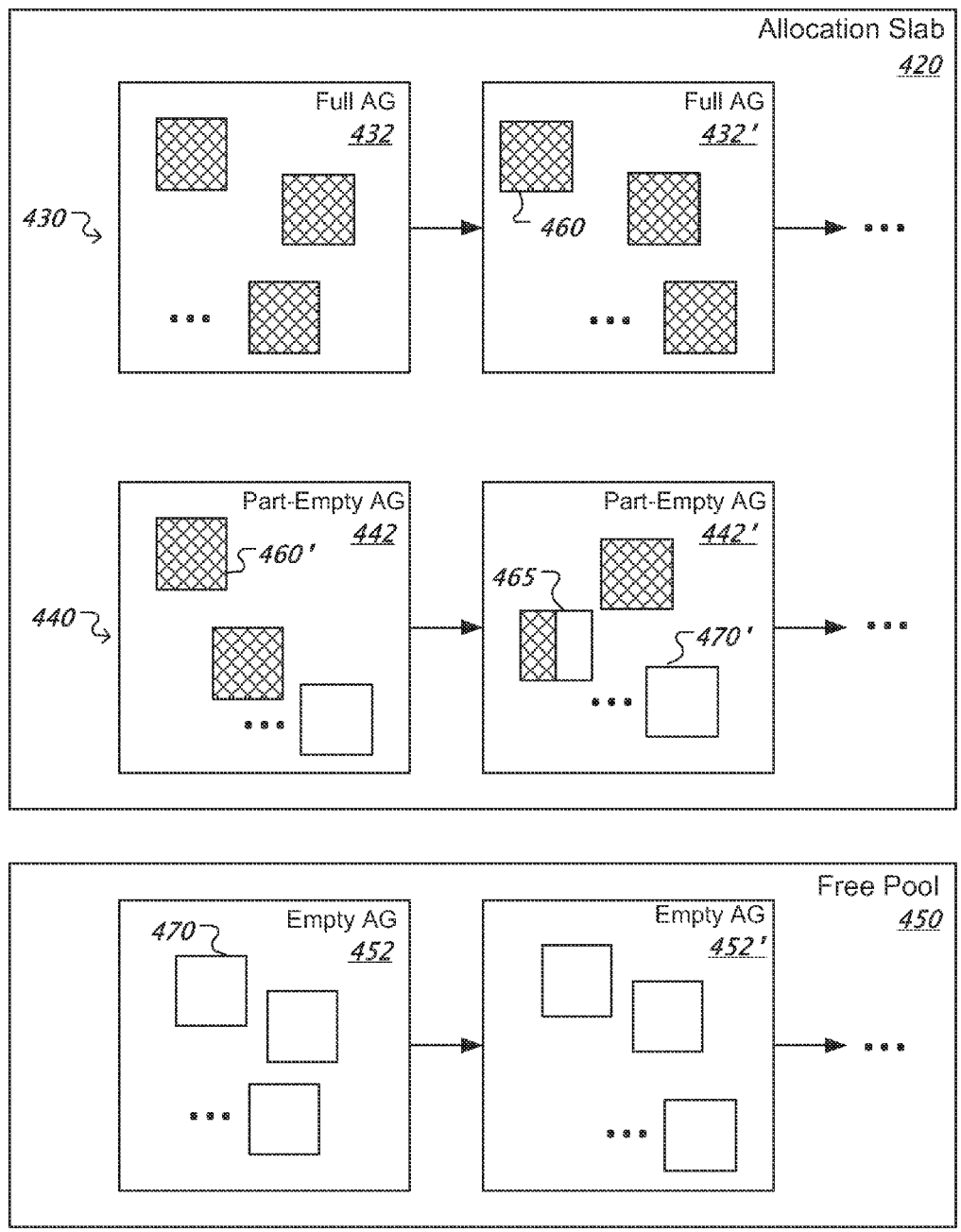
FIGS. 4 and 5 show examples of substructures used in managing the cache address space associated with the cache devices.

FIG. 4 shows an example of a substructure 420 for managing the cache address space associated with the cache devices. The substructure 420 can be referred to, interchangeably, as an allocation slab. In the example illustrated in FIG. 2, the allocation slab 420 corresponds to one of the multiple portions 220, 230, . . . of the cache address space 215 associated with the cache device in accordance with the management structure 210. As described above in connection with FIG. 2, sizes of allocations served from the allocation slab 420 are larger than or equal to an associated minimum amount of data allowed to be cached therein. For example, if the allocation slab 420 corresponds to the designated portion 230, the allocations 235 served from the allocation slab 420 each has a size larger than or equal to the minimum amount 232, e.g., four chunks.

In order to manage a part of the cache address space corresponding to the allocation slab 420, another substructure called an allocation group can be introduced. In this manner, the allocation slab 420 includes one or more allocation groups 432, 432', 442, 442', . . . ; additionally, an order of the allocation groups 432, 432', 442, 442', . . . included in the allocation slab 420 is equal to the order of the allocation slab 420. Equivalently, allocations served from any of the allocation groups 432, 432', 442, 442', . . . included in the slab 420 have a size larger than or equal to the minimum amount of data allowed to be cached within the slab 420. As the allocation slabs are designated to have different orders, an allocation group of order "m" that is part of an allocation slab of order "m" cannot also be part of another allocation slab of order "n≠m", because the order "m" of the allocation group would not match the order "n" of the other allocation slab, although a match should occur if the allocation group of order "m" also were part of the other allocation slab of order "n".

Each of the allocation groups 432, 432', 442, 442', . . . included in the allocation slab 420 corresponds to a contiguous address range within the part of cache address space associated with the allocation slab 420. Specifically, a predetermined quantity "N" of subgroups each formed from $2^m$ contiguous chunks (where "m" is the order of the slab 420) is contained in each of the allocation groups 432, 432', 442, 442', . . . included in the allocation slab 420. The predetermined quantity "N" can be designated when defining the management structure 210, for instance. Management of the "N" subgroups in each of the allocation groups 432, 432', 442, 442', . . . included in the allocation slab 420 is described in detail below in connection with FIG. 5.

In operation, the allocation groups 432, 432', . . . are considered occupied (full) when all "N" subgroups of each of the allocation groups 432, 432', . . . are occupied. A subgroup is occupied when all $2^m$ chunks of the occupied subgroup 460 have been served to one or more allocations. Examples of occupied subgroups 460, 460', . . . are depicted by hashed-rectangles. The allocation groups 442, 442', . . . are considered partially-occupied (part-free) when at least some but not all of the "N" subgroups of each of the allocation groups 442, 442', . . . are partially-occupied or unoccupied. A subgroup is partially-occupied when less than all $2^m$ chunks of the partially-occupied subgroup have been served to one or more allocations. An example of a partially-occupied subgroup 465 is depicted by a partially-hashed-rectangle.) A subgroup is unoccupied when none of the $2^m$ chunks of the unoccupied subgroup has been served to one or more allocations.

Examples of unoccupied subgroups 470, 470', . . . are depicted by unfilled-rectangles.

Moreover, the allocation groups 432, 432', 442, 442', . . . included in the allocation slab 420 can be organized based on whether they are occupied or partially-occupied. In this manner, the allocation slab 420 contains two collections 430, 440 of allocation groups. In some implementations, the collections represent lists (e.g., linked lists.) In some implementations, the collections represent tables. One of the two collections is an occupied collection 430 to keep track of the allocation groups 432, 432', . . . with all subgroups occupied. For example, the controller 130 can skip the occupied collection 430 when searching through the allocation slab 420 for partially-occupied allocation groups from which to serve allocations. Another one of the two collections is a partially free collection 440 to keep track of allocation groups 442, 442', . . . which are partially occupied. For example, the controller 130 can serve allocation requests from allocation groups in the partially free collection 440. Rules related to searching the two collections 430, 440 when serving allocation requests are described below in connection with FIG. 6.

In addition, each of the two collections 430, 440 has an associated index such that entries of the associated index represent identifiers of the allocation groups that are part of each of the two collections 430, 440. Thus, given an offset of a cache address, an allocation group that corresponds to the cache address can be determined by searching the respective indexes of the two collections 430, 440.

Apart from substructures like the allocation slabs 420, 220, 230, . . . , and the allocation groups 432, 432', 442, 442', . . . therein, the management structure 210 can include a pool of free allocation groups 450 that stores allocation groups 452, 452', . . . which are completely free. Any of the free allocation groups 452, 452', . . . maintained as part of the free pool 450 can be exported from the free pool 450 to an allocation slab from among the multiple allocation slabs 420, 220, 230, . . . associated with the cache address space 215 when all allocation groups contained in the allocation slab are fully occupied. Moreover, an allocation group from among the multiple allocation slabs 420, 220, 230, . . . can be imported into the free pool 450 when the allocation group becomes unoccupied (e.g., upon freeing all the "N" chunks included in the allocation group.) An order "m" is not being defined for the free pool 450, and thus, an allocation group from among the allocation groups 452, 452', . . . maintained as part of the free pool 450 can acquire the order "m" of an allocation slab from among the multiple allocation slabs 420, 220, 230, . . . upon exporting the allocation group from the free pool 450 to the allocation slab.

Figure 5:
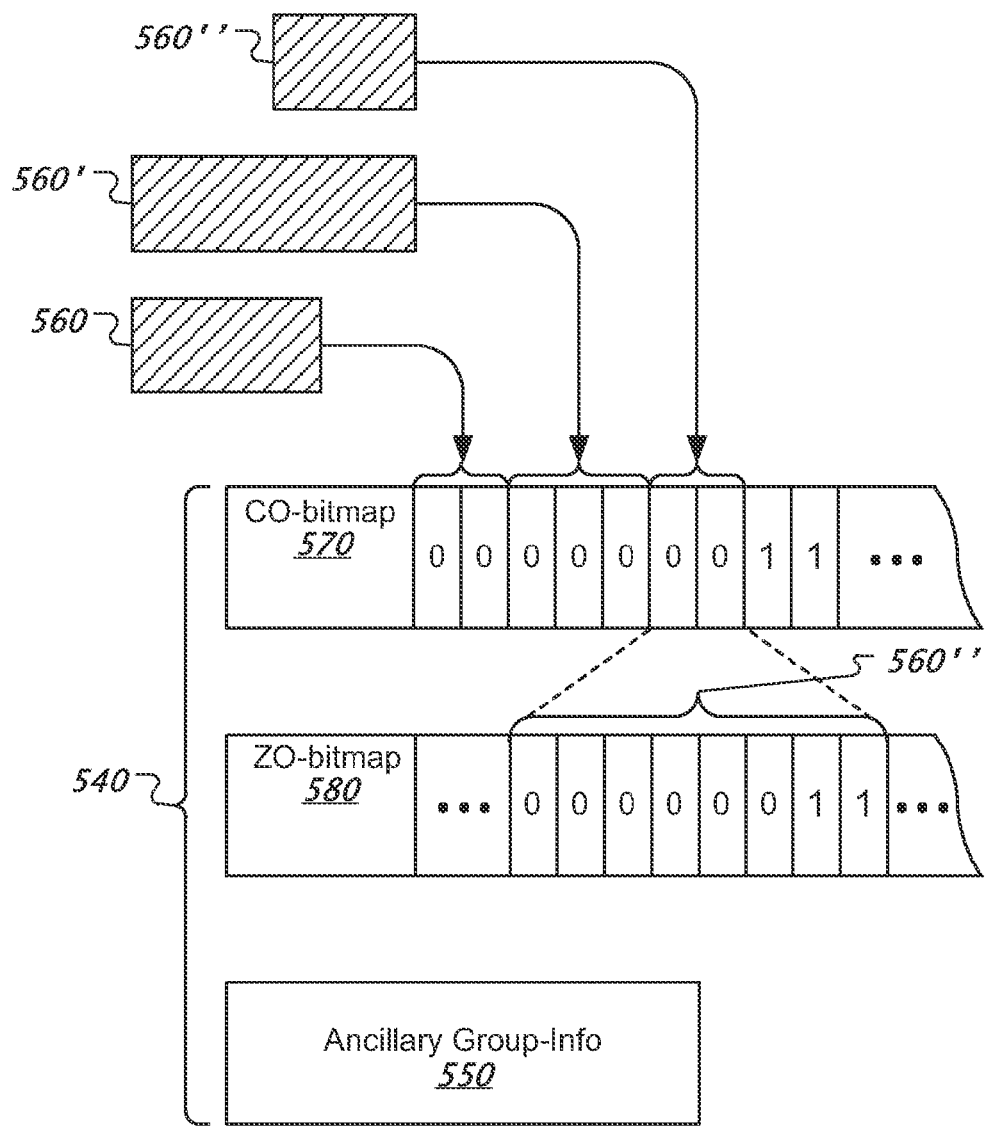

FIG. 5 shows another example of a substructure 540 for managing the cache address space associated with the cache devices. In the example illustrated in FIG. 4, the substructure 540 corresponds to an allocation group from among the partially-occupied allocation groups 442, 442', . . . ; the allocation group 540 corresponds to a contiguous address range within the part of cache address space associated with an allocation slab of order "m" (e.g., allocation slab 420.) Moreover, "N" subgroups each formed from $2^m$ contiguous chunks (where "m" is the order of the allocation slab) are contained in the allocation group 540. For example, the allocation group 540 is contained in an allocation slab of order m=2. Accordingly, each of the "N" subgroups of chunks in the allocation group 540 has four chunks ($4=2^2$,) and therefore allocations of no less than four chunks in size can be served from the allocation group 540. Additionally in this example, there are N=32 subgroups of four chunks in the allocation group 540.

The allocation group 540 has an allocation group identifier, AG_ID. The AG_ID can be used to determine the range of cache pages mapped by the allocation group 540. For example, an allocation group 540 can contain 128 chunks, where each chunk has 16 K. Such allocation group 540 corresponds to a range of cache address space of 2044 K (=2 MB.) Then, the allocation group 540 having an AG_ID=10 corresponds to a region of the cache address space from 20 MB to 22 MB.

Selecting a cache address for caching data within the contiguous part of the cache address space corresponding to the allocation group 540 can be performed at least in part by using a data structure 570 associated with the allocation group 540. The data structure 570 is configured to indicate whether the "N" subgroups included in the allocation group 540 are occupied or partially occupied. The data structure 570 can be implemented as a bitmap and can be referred to, interchangeably, as a current-order (CO) bitmap. For instance, the CO-bitmap 570 contains "N" bits, such that a bit value=1 corresponds to an associated subgroup from among the $2^m$ contiguous chunks that is available for allocation, i.e., is free, and a bit value=0 corresponds to an associated subgroup from among the $2^m$ contiguous chunks that is unavailable for allocation, i.e., is allocated. Accordingly, the CO-bitmap 570 provides a subgroup-level representation of occupancy for the allocation group 540.

Further, removing a part of data cached at a cache address within the contiguous part of the cache address space corresponding to the allocation group 540 can be performed at least in part by using the data structure 570 associated with the group 540 and another data structure 580 associated with the group 540. The other data structure 580 is configured to indicate whether the $2^m$ associated chunks included in each of the "N" subgroups of the allocation group 540 are free or occupied. The data structure 580 can be implemented as a bitmap and can be referred to, interchangeably, as a zero-order (ZO) bitmap. For instance, the ZO-bitmap 580 contains N×$2^m$ bits, one bit for each of the chunks included in the allocation group 540, such that a bit value=1 corresponds to an associated chunk that is free from among the $2^m$ contiguous chunks in a respective subgroup, and a bit value=0 corresponds to an associated chunk that is allocated from among the $2^m$ contiguous chunks in the respective subgroup. Accordingly, the ZO-bitmap 580 provides a chunk-level representation of occupancy for the allocation group 540.

In the example illustrated in FIG. 5, the order associated with the allocation group 540 is m=2, and there are N=32 subgroups of four chunks in the allocation group 540. Accordingly, the CO-bitmap 570 has 32 bits, one for each of the N=32 subgroups of four chunks in the allocation group 540, and the ZO-bitmap 580 has 128 bits, one for each of the 32×$2^2$ chunks in the allocation group 540. In this example, the CO-bitmap 570 can be stored in 4 bytes of memory and the ZO-bitmap 580 can be stored in 16 bytes of memory. Even if the CO-bitmap 570 had 128 bits, corresponding to an allocation group 540 of order m=0, the CO-bitmap 570 and the ZO-bitmap 580 together need not require any more than 32 bytes to store.

FIG. 5 also shows an example of mapping between cached data 560, 560' and 560" corresponding to respective allocations served within the allocation group 540 and the combination of the CO-bitmap 570 and the ZO-bitmap 580 associated with the allocation group 540. For example, the cached data 560 has a size of 8 chunks and corresponds to an allocation of two subgroups of the allocation group 540. Accordingly, the cached data 560 occupies two (the first and second) subgroups of the 32 subgroups contained in the allocation group 540, and equivalently, the cached data 560 occupies eight (the first eight) chunks (2 subgroups×4 chunks per subgroup) of the 128 chunks of the allocation group 540. Therefore, the cached data 560 corresponds to the first two bits of the CO-bitmap 570, and to the first eight bits of the ZO-bitmap 580. To indicate that the first and second subgroups of the allocation group 540 are occupied, the first two bits of the CO-bitmap 570 are set to 0 (shown in FIG. 5), and the first eight bits of the ZO-bitmap 580 are also set to 0 (not shown in FIG. 5). As another example, the cached data 560' has a size of 12 chunks and correspond to another allocation of three of subgroups of the allocation group 540. Accordingly, the cached data 560' occupies three (the $3^{rd}$ through $5^{th}$) subgroups of the 32 subgroups contained in the allocation group 540, and equivalently, the cached data 560' occupies twelve (the $9^{th}$ through $20^{th}$) chunks (3 subgroups×4 chunks per subgroup) of the 128 chunks of the allocation group 540. Therefore, the cached data 560' corresponds to the $3^{rd}$ through $5^{th}$ bits of the CO-bitmap 570, and to the $9^{th}$ through $20^{th}$ bits of the ZO-bitmap 580. To indicate that the $3^{rd}$ through $5^{th}$ subgroups of the allocation group 540 are occupied, the $3^{rd}$ through $5^{th}$ bits of the CO-bitmap 570 are set to 0 (shown in FIG. 5), and the $9^{th}$ through $20^{th}$ bits of the ZO-bitmap 580 are also set to 0 (not shown in FIG. 5).

Cached data 560" has a size of 6 chunks and corresponds, for instance, to an allocation of two subgroups (or eight chunks) of the allocation group 540 followed by a release (free) of two chunks. Accordingly, the cached data 560" occupies six (the $21^{st}$ through $26^{th}$) chunks of the 128 chunks of the allocation group 540, and equivalently, the cached data 560" partially occupies two (the $6^{th}$ and half of the $7^{th}$) subgroups of the 32 subgroups contained in the allocation group 540. Therefore, the cached data 560" corresponds to the $6^{th}$ and $7^{th}$ bits of the CO-bitmap 570, and to the $21^{st}$ through $26^{th}$ bits of the ZO-bitmap 580. To indicate that the $6^{th}$ and $7^{th}$ subgroups of the allocation group 540 are not free, the $6^{th}$ and $7^{th}$ bits of the CO-bitmap 570 are set to 0 (show in FIG. 5). However, to indicate that the $21^{st}$ through $26^{th}$ chunks of the allocation group 540 are occupied and the $27^{th}$ and $28^{th}$ chunks of the allocation group 540 are free, the $21^{st}$ through $26^{th}$ bits of the ZO-bitmap 580 are set to 0, but the $27^{th}$ and $28^{th}$ bits of the ZO-bitmap 580 are maintained at 1 (shown in FIG. 5).

The allocation group 540 further includes ancillary information 550 used to store various characteristics of the allocation group 540. The ancillary information 550 includes the current order "m" of the allocation group. As described above, the order of the allocation group 540 corresponds to the order of the allocation slab that contains the allocation group 540. In the example illustrated in FIG. 5, the current order is m=2. There is 1 byte dedicated for storing the current order information. A quantity of free subgroups (or free buddies) of $2^m$ chunks is also included in the ancillary information 550. In the current example, the allocation group 540 has 32 subgroups out of which 7 are currently occupied as indicated in the CO-bitmap 570. Hence, the number of free subgroups in the allocation group 540 is 25. There is 1 byte dedicated for storing information about the quantity of free subgroups. The ancillary information 550 further includes a reference to the allocation slab (e.g., a list head to the associated link list in the allocation slab). As described above in connection with FIG. 4, the allocation group 540 can be part of one of two linked lists 430, 440 associated with slab 420 depending on whether the allocation group 540 is occupied or partially occupied, and 8 bytes can be dedicated for storing information about the associated link list of the corresponding allocation slab. Furthermore, the ancillary information 550 can include spin-lock information. The spin-lock information specifies whether the allocation group 540 is currently locked because data is currently cached to or freed from addresses associated with the allocation group 540. There are 4 bytes dedicated for the spin-lock information. The start index of the first chunk included in the allocation group 540 can also be stored in the ancillary information 550. There are 4 bytes dedicated for information about the start index of the first chunk. The ancillary information 550 can also include flags for specifying particular characteristics (if any) of the allocation group 540. There are 2 bytes dedicated for storing information about the flags associated with the allocation group 540.

In all, the ancillary information 550 associated with the allocation group 540 can be stored in a total of 20 bytes. In addition, as noted above, the CO-bitmap 570 and the ZO-bitmap 580 associated with the allocation group 540 together need not require any more than 32 bytes to store. Accordingly, the cumulative overhead for managing an allocation group 540 having 128 chunks of 16 K per chunk is 52 bytes or 3.25 bits per chunk. For example, a cache address space having a size of 256 GB can be managed in approximately 6.5 MB of memory by using the disclosed systems and methods (e.g., the combination 140 of the management structure and rules implemented with 128 chunks per allocation group and a 16 K chunk size.)

Figure 6:
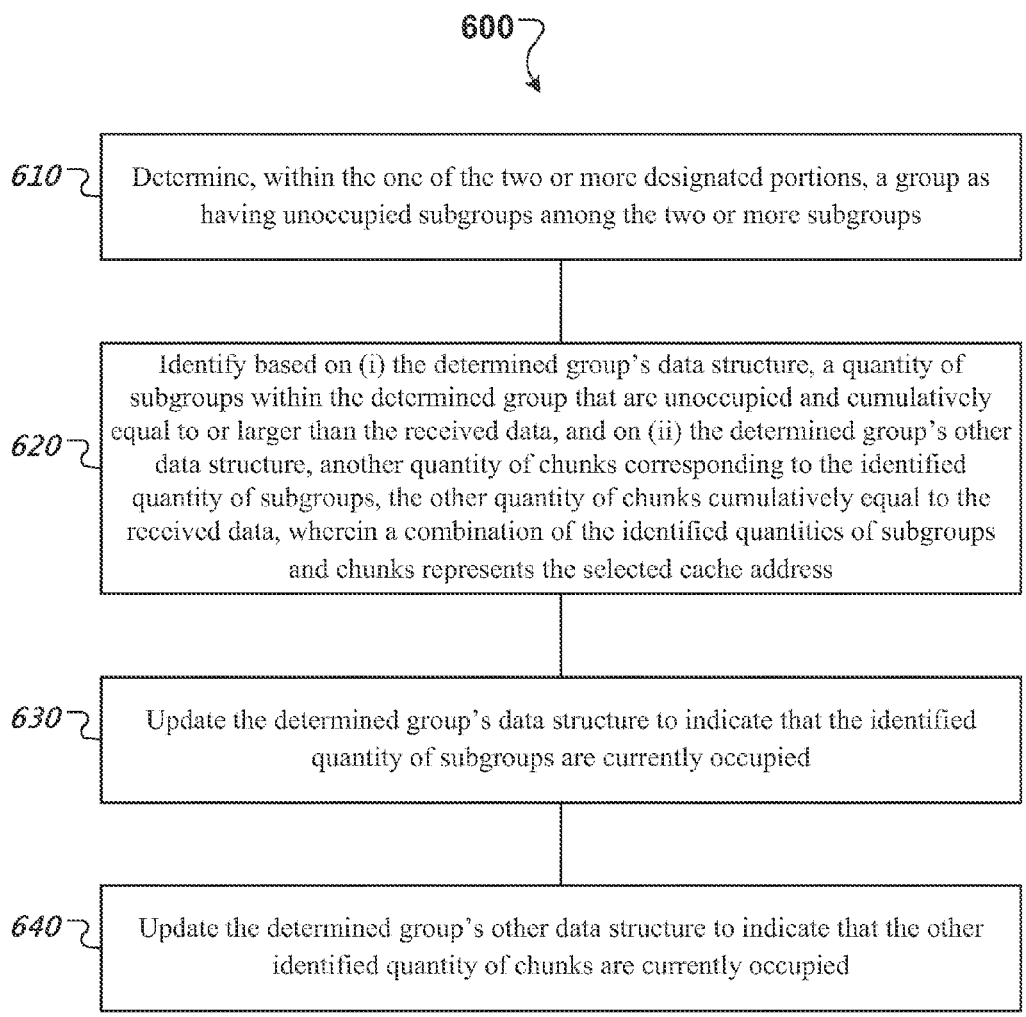
FIG. 6 shows an example of a cache-allocation method based on the disclosed management structure.

FIG. 6 shows an example of a cache-allocation method 600 based on the disclosed management structure. In the example shown in FIG. 1, the method 600 can be performed by the controller 130 and can be implemented as part of system 100. Moreover, the method 600 can be used in combination with method 200 for selecting a cache address from the one of the two or more designated portions (e.g., allocation slabs 420, 220, 230, . . . ) of the cache address space 215 associated with a cache device (e.g., 110) for caching data received from a storage system (e.g., 120). The received data to be cached at the selected cache address has a size of multiple chunks. An allocation slab from which to select the cache address is identified as having the highest order "m", such that the size of the data to be cached is larger than or equal to $2^m$ chunks (corresponding to the minimum amount allowed to be cached in the identified slab), as described above in connection with FIG. 3.

At 610, an allocation group having unoccupied subgroups is determined within the identified allocation slab. If no partially occupied allocations groups (e.g., 442, 442', . . . ) are available in the identified slab (e.g., 420) then an allocation group can be imported from a pool of free allocation groups (e.g., free pool 450.) If the free pool 450 is empty, then the determination at 610 can be retried from a lower order allocation slab. If lower allocation slabs are not available, because the identified allocation slab is the lowest order allocation slab, then cache eviction from a cache address corresponding to the identified slab can be triggered. However, if the identified allocation slab (e.g., 420) has at least one partially occupied allocation group (e.g., one of 442, 442', . . . from the partially free collection 440 of allocation groups) then the allocation is served from that allocation group.

At 620, a quantity of subgroups within the determined allocation group that are unoccupied and cumulatively equal to the received data is identified based on the allocation group's data structure (e.g., CO-bitmap 570) and another quantity of chunks corresponding to the identified quantity of subgroups is further identified based on the determined allocation group's other data structure (e.g., ZO-bitmap 580). The other quantity of chunks cumulatively equals the size of the received data, such that a combination of the identified quantities of subgroups and chunks represents the selected cache address. For example, the CO-bitmap is used to find a first free entry of current order corresponding to a subgroup of the determined allocation group (e.g., respective subgroup entries for allocations 560, 560', 560" in CO-bitmap 570.) Then the ZO-bitmap is used to identify sub order or unaligned free chunks if necessary (e.g., chunk entries for allocation 560" in ZO-bitmap 580.)

At 630, the determined group's data structure (e.g., CO-bitmap 570) is updated to indicate that the identified subgroups are currently occupied, and at 640, the determined group's other data structure (e.g., ZO-bitmap 580) is updated to indicate that the identified chunks are currently occupied. For example, once the first "set" bit (=1) is identified in CO-bitmap, the identified bit is toggled to 0 and corresponding single chunk bits in ZO-bitmap are also toggled to zero.

Figure 7:
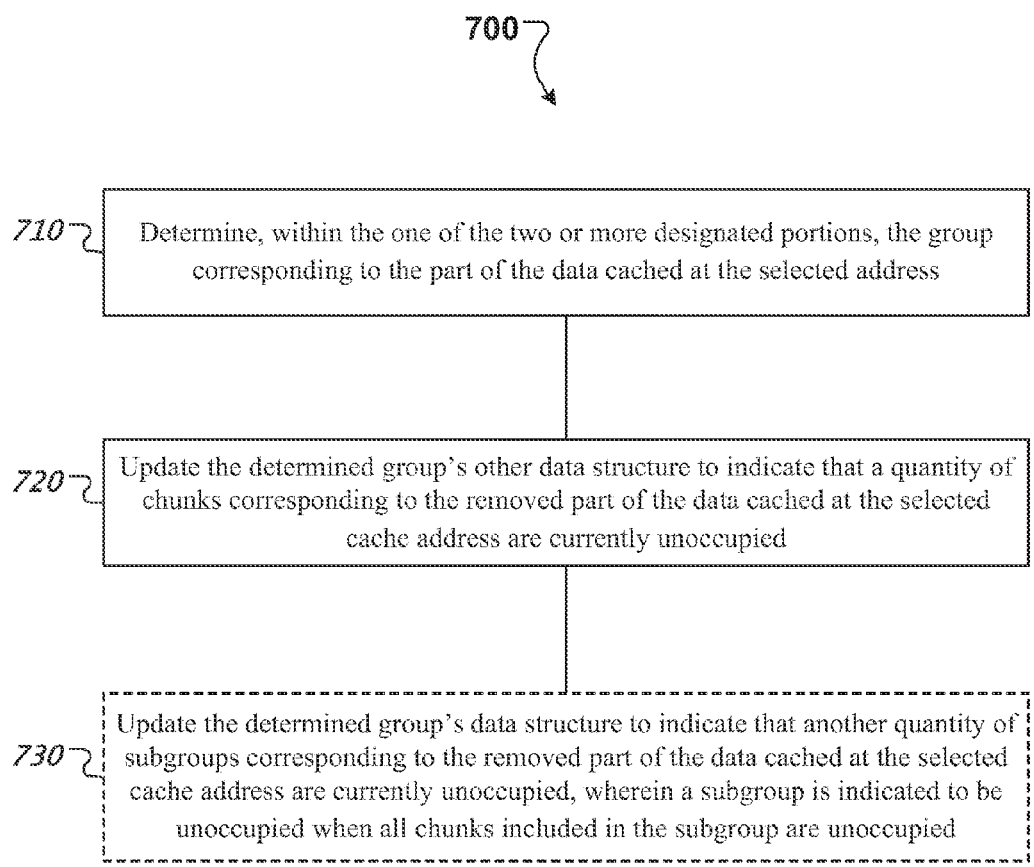
FIG. 7 shows an example of a cache-freeing method based on the disclosed management structure.

FIG. 7 illustrates a method 700 for releasing cached data based on the claimed management scheme. In the example shown in FIG. 1, the method 700 can be performed by the controller 130 and can be implemented as part of system 100. Moreover, the method 700 can used in combination with method 200 for removing a part of data cached at a selected cache address. Requests for cache frees include a start-offset and length of range for the part of cached data to be freed. The start-offset of the data to be freed is aligned with a chunk and the range of the data to be freed is a multiple of chunks.

At 710, the allocation group corresponding to the part of the data to be freed at the selected address is determined within an allocation slab. For example, the identifier of the allocation group can be determined by dividing (bit shift, e.g., right shift of 5) the received start offset expressed in terms of the chunk identifier by the quantity of chunks per allocation group. As another example, the identifier of the allocation group can be determined by a right shift of 7 performed on the received start offset of the cache address space.

At 720, the determined allocation group's other data structure (e.g., ZO-bitmap 580) is updated to indicate that a quantity of chunks corresponding to the removed part of the data cached at the selected cache address is currently unoccupied. For example, the bits in the ZO-bitmap of the determined allocation group, starting with the bit associated with the start-offset chunk and including bits corresponding to a quantity of chunks equivalent to the range of data to be freed, are set to 1.

Optionally at 730, the determined allocation group's data structure (e.g., CO-bitmap 570) can be updated to indicate that subgroup(s) corresponding to the removed part of the data cached at the selected cache address are currently unoccupied. Specifically, a subgroup is indicated to be unoccupied when all chunks included in the subgroup are unoccupied. For example, if the quantity of bits toggled to 1 in the ZO-bitmap is larger than or equal to $2^m$, where m is the order of the determined allocation group, and if the bits toggled to 1 in the ZO-bitmap are aligned with a bit in the CO-bitmap, then a subgroup of $2^m$ chunks that corresponds to the aligned bit in the CO-bitmap is indicated to be unoccupied by setting the latter to 1.

The method 700 can optionally include determining that all subgroups of the determined allocation group are unoccupied in response to removing the part of the data cached at the selected cache address, and indicating that the group is unoccupied in response to the determination. For example, if freeing the part of the data at the selected address results in the identified allocation group being totally free, then the free allocation group can be exported to the free pool of allocation groups (e.g., 250.) Once part of the free pool, the unoccupied allocation group can be managed along with other free allocation groups 452, 452', . . . as described above in connection with FIG. 5.

A few implementations have been described in detail above, and various modifications are possible. The disclosed subject matter, including the functional operations described in this specification, can be configured in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
managing an allocation data structure for a memory, wherein the allocation data structure indicates groupings of memory space, each of the groupings having a different associated integer, and each of the groupings serving memory space in portions equal to a unit of memory space allocation times the associated integer for that grouping;
receiving a request for allocation within the memory, wherein the request has an associated number of the unit of memory space allocation; and
selecting one of the groupings from which to serve the request for allocation within the memory based on the associated number in comparison with values obtained using the different associated integers as an exponent.

2. The method of claim 1, wherein the values are powers of two, the portions are contiguous chunks of the memory, and the unit of memory space allocation is a predetermined chunk size.

3. The method of claim 2, comprising:
allocating memory space in amounts equal to the associated integer, for respective ones of the groupings, times the predetermined chunk size; and
freeing memory space in an amount equal to the predetermined chunk size, for all of the groupings.

4. The method of claim 1, wherein each of the groupings comprises one or more groups, each of the groups uses a first bitmap and a second bitmap to represent memory allocations for a contiguous space inside the memory, and the method comprises:
on an allocation using at least one of the groups, changing a bit in the first bitmap to represent two or more units of memory space allocation, and changing two or more bits in the second bitmap to represent the two or more units of memory space allocation; and
on a free request, changing one or more bits in the second bitmap, and when this results in creation of a set of two or more free and aligned units of memory space, changing a corresponding bit in the first bitmap.

5. The method of claim 4, wherein the selecting comprises:
checking for a partially occupied group in a grouping whose smallest served memory space portion is closest to, without exceeding, a requested amount of memory space;
checking for a new group when no partially occupied group is found; and
serving the request from another grouping, which serves in an even smaller memory space portion, when no new group is found.

6. The method of claim 4, wherein each of the groups has an identifier that indicates a range of cache pages mapped by the group.

7. The method of claim 4, wherein the first bitmap is 128 bits, the second bitmap is 128 bits, and the first bitmap and the second bitmap are stored in 32 bytes.

8. A non-transitory computer-readable medium embodying a program operable to cause one or more data processing apparatus to perform operations comprising:
managing an allocation data structure for a memory, wherein the allocation data structure indicates groupings of memory space, each of the groupings having a different associated integer, and each of the groupings serving memory space in portions equal to a unit of memory space allocation times the associated integer for that grouping;
receiving a request for allocation within the memory, wherein the request has an associated number of the unit of memory space allocation; and
selecting one of the groupings from which to serve the request for allocation within the memory based on the associated number in comparison with values obtained using the different associated integers as an exponent.

9. The non-transitory computer-readable medium of claim 8, wherein the values are powers of two, the portions are contiguous chunks of the memory, and the unit of memory space allocation is a predetermined chunk size.

10. The non-transitory computer-readable medium of claim 9, wherein the operations comprise:
allocating memory space in amounts equal to the associated integer, for respective ones of the groupings, times the predetermined chunk size; and
freeing memory space in an amount equal to the predetermined chunk size, for all of the groupings.

11. The non-transitory computer-readable medium of claim 8, wherein each of the groupings comprises one or more groups, each of the groups uses a first bitmap and a second bitmap to represent memory allocations for a contiguous space inside the memory, and the operations comprise:
on an allocation using at least one of the groups, changing a bit in the first bitmap to represent two or more units of memory space allocation, and changing two or more bits in the second bitmap to represent the two or more units of memory space allocation; and
on a free request, changing one or more bits in the second bitmap, and when this results in creation of a set of two or more free and aligned units of memory space, changing a corresponding bit in the first bitmap.

12. A system comprising:
a memory; and
a controller configured to manage requests for allocations of space within the memory in accordance with a management structure and selection rules;
wherein the management structure indicates allocation slabs for the memory, each of the allocation slabs having a different order, with the order corresponding to an amount of memory space allocation; and
wherein the selection rules indicate that, in response to a request having an associated size, an available highest order slab that is closest to the associated size is selected to fulfill the request.

13. The system of claim 12, wherein the order for each of the allocation slabs is an integer greater than zero, the amount of memory space allocation is a fixed number of contiguous chunks of the memory, each of the chunks has a predetermined size, and the selection rules check that two to the power of the integer of the available highest order slab is less than or equal to a number of requested chunks.

14. The system of claim 13, wherein the controller is configured to allocate memory space in amounts equal to the respective fixed numbers for the allocation slabs times the predetermined size of the chunks, and free memory space in an amount equal to the predetermined size of the chunks for all of the allocation slabs.

15. The system of claim 12, wherein each of the allocation slabs comprises one or more allocation groups, each of the allocation groups having an order equal to the order of its corresponding allocation slab, each of the allocation groups providing memory allocations that are greater than or equal to the amount of memory space allocation of its corresponding allocation slab, and each of the allocation groups comprising a current order bitmap and a zero order bitmap.

16. The system of claim 15, wherein each of the allocation slabs comprises a list of occupied allocation groups and a list of partially occupied allocation groups, and wherein the controller is configured to serve the request from a highest order slab having at least one partially occupied allocation group or from an allocation group taken from a free pool of allocation groups, else if the free pool is empty, then serve the request from a next highest order slab having at least one partially occupied allocation group.

17. The system of claim 15, wherein each of the allocation groups has an identifier that indicates a range of pages mapped by the allocation group.

18. The system of claim 15, wherein the current order bitmap is 128 bits, the zero order bitmap is 128 bits, and the current order bitmap and the zero order bitmap are stored in 32 bytes.

19. The system of claim 18, wherein the current order bitmap and the zero order bitmap are stored are stored using a 32 byte aligned cache.

20. The system of claim 12, wherein the memory comprises a block based solid state disk (SSD) cache for a storage system.

21. A method comprising:
  receiving requests for allocations of space within a memory; and
  managing the requests in accordance with a management structure and selection rules;
  wherein the management structure indicates allocation slabs for the memory, each of the allocation slabs having a different order, with the order corresponding to an amount of memory space allocation; and
  wherein the selection rules indicate that, in response to a request having an associated size, an available highest order slab that is closest to the associated size is selected to fulfill the request.

22. The method of claim 21, wherein the order for each of the allocation slabs is an integer greater than zero, the amount of memory space allocation is a fixed number of contiguous chunks of the memory, each of the chunks has a predetermined size, and the selection rules cause checking that two to the power of the integer of the available highest order slab is less than or equal to a number of requested chunks.

23. The method of claim 22, comprising allocating memory space in amounts equal to the respective fixed numbers for the allocation slabs times the predetermined size of the chunks, and free memory space in an amount equal to the predetermined size of the chunks for all of the allocation slabs.

24. The method of claim 21, wherein each of the allocation slabs comprises one or more allocation groups, each of the allocation groups having an order equal to the order of its corresponding allocation slab, each of the allocation groups providing memory allocations that are greater than or equal to the amount of memory space allocation of its corresponding allocation slab, and each of the allocation groups comprising a current order bitmap and a zero order bitmap.

25. The method of claim 24, wherein each of the allocation slabs comprises a list of occupied allocation groups and a list of partially occupied allocation groups, and the method comprises:
  serving the request from a highest order slab having at least one partially occupied allocation group or from an allocation group taken from a free pool of allocation groups; else if the free pool is empty, then serving the request from a next highest order slab having at least one partially occupied allocation group.

* * * * *